United States Patent [19]

Björshol

[11] Patent Number: 4,597,216

[45] Date of Patent: Jul. 1, 1986

[54] FISH HOOK PROTECTOR

[76] Inventor: Kolbjörn Björshol, N-6560, Langöyneset, Norway

[21] Appl. No.: 629,835

[22] PCT Filed: Nov. 18, 1983

[86] PCT No.: PCT/NO83/00051
§ 371 Date: Jul. 9, 1984
§ 102(e) Date: Jul. 9, 1984

[87] PCT Pub. No.: WO84/02057
PCT Pub. Date: Jun. 7, 1984

[30] Foreign Application Priority Data
Nov. 22, 1982 [NO] Norway ................... 823898

[51] Int. Cl.⁴ .............................................. A01K 97/06
[52] U.S. Cl. ...................................... 43/43.2; 43/43.4;
43/42.4; 43/42.43
[58] Field of Search ............... 43/43.2, 43.4, 43.6,
43/57.3, 42.4, 42.43, 25.2

[56] References Cited

U.S. PATENT DOCUMENTS

| 867,439 | 10/1907 | Staehle | 43/43.2 |
| 2,733,533 | 2/1956 | Standard | 43/43.2 |
| 2,785,498 | 3/1957 | Youngquist et al. | 43/43.4 |
| 3,040,466 | 6/1962 | Jablonski | 43/42.43 |
| 3,670,445 | 6/1972 | Borger | 43/42.4 |

Primary Examiner—Nicholas P. Godici
Assistant Examiner—Carmine Cuda
Attorney, Agent, or Firm—Watson, Cole, Grindle & Watson

[57] ABSTRACT

A fish hook protector includes a plate-like center part having opposite side edges which are parallel, an elongated gripping part which extends along one of the opposite sides and includes an elongated channel for gripping the leg portion of a fish hook, and an elongated shielding part which extends along the other of the opposite sides and includes an elongated channel for covering at least the sides of a curved portion of the fish hook whose leg portion is received in the elongated gripping part. The elongated gripping part preferably has a claw-shaped cross section and the elongated shielding part preferably has a generally V-shaped cross section.

5 Claims, 3 Drawing Figures

FISH HOOK PROTECTOR

BACKGROUND OF THE INVENTION

The present invention relates to a protector or guard for a fish hook, the primary purpose of which is to prevent the hook from becoming entangled in ropes, other hooks or the like, but which also prevents the hook from causing damage.

Such protection is of particular importance in long line fishing wherein several thousand hooks are connected to the individual line and wherein such a line, prior to the baiting and setting steps, is stored on a drum or stored on rails with all the hooks freely suspended, or in a bin.

SUMMARY OF THE INVENTION

According to the present invention the fish hook protector comprises a plate-like center part which has opposite side edges that are parallel to one another, an elongated gripping part which extends along one of the two opposite side edges and an elongated shielding part which extends along the other side edge, these elongated gripping and shielding parts being respectively adapted to receive the leg portion and the curved point portion of a fish hook. With such a shape, the elongated gripping part may be placed around the hook leg portion, while the curved point portion of the hook, by displacement of the protector along the hook leg portion, can be passed into a protected position in the elongated shielding part, the curved point portion being also easily released by displacement of the protector along the hook leg portion or by tearing.

The inventive protectors may be produced in a very simple manner, such as by extruding a plastic material so as to have the desired cross sectional shape and then cutting the extruded product into sections having the desired length. Thus, the elongated gripping part which is to receive the hook leg portion may be made with a claw-formed section having resilient walls and a slot opening in the desired direction, while the elongated shielding part which is to receive the hook point portion is made with a V-formed, U-formed or annular section.

The invention will be described in more detail with reference to the accompanying drawings.

DETAILED DESCRIPTION OF THE PREFERRED EMBODIMENT

Figure 1:
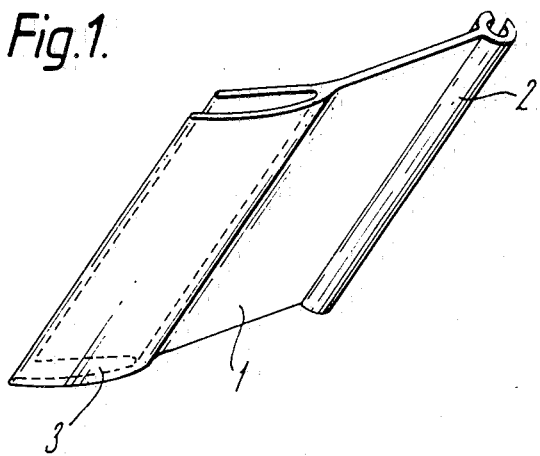
FIG. 1 shows a perspective view of a protector according to a preferred embodiment of the present invention.
Figure 2:
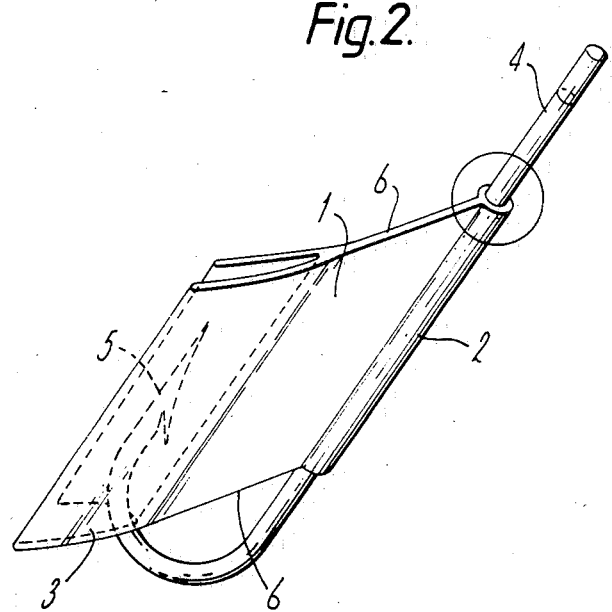
FIG. 2 shows the protector of FIG. 1 when operatively connected to a fishing hook.
Figure 3:
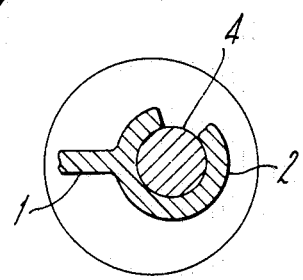
FIG. 3 is a sectional view of the elongated gripping part which is adapted to receive a hook leg.

In the drawing, 1 is a sheet-formed (plate-like) portion which, along two parallel extending edges passes into an open, elongated gripping part 2 of claw shaped cross section and an elongated shielding part 3 of essentially V formed cross section, respectively. The protector may, preferably, be made of extruded, relatively soft plastic material and may be a cut off length of an extruded product, so that the elongated gripping part 2 may easily be placed on and kept on the leg portion 4 of a fish hook, at the same time as the elongated gripping part 3 encloses at least the sides of the curved point portion 5 of the fishing hook. In order to prevent the protector from becoming entangled in ropes or other hooks, it is convenient to give this sheet-formed center part the shape of a rhombus, the free edges 6 slanting towards the two parts 2 and 3, as shown in FIG. 1.

Such protection is of particular importance in long line fishing, in which hooks by the thousands are connected to the individual line and wherein the line, prior to baiting and setting, is stored on a drum or on rails with all the hooks freely suspended, or in a bin.

I claim:

1. A fish hook protector for use with a fish hook which includes a leg portion and a curved point portion, said fish hook protector comprising
    a plate-like center part which has two opposite side edges which are parallel to one another,
    an elongated gripping part which extends along a first of said two opposite sides of said center part, said elongated gripping part including an elongated channel therein for receiving the leg portion of a fish hook, and
    an elongated shielding part which extends along a second of said two opposite sides of said center part, said elongated shielding part including an elongated channel therein for receiving and covering at least the sides of the curved point portion of a fish hook whose leg portion is received in said elongated gripping part, the elongated channel in said elongated shielding part extending in parallel with the elongated channel in said elongated gripping part.

2. A fish hook protector as defined in claim 1, wherein said elongated gripping part includes resilient walls which provide a claw-shaped cross section.

3. A fish hook protector as defined in claim 1, wherein said elongated shielding part includes walls which extend away from said plate-like center part and which provide a generally V-shaped cross section.

4. A fish hook protector as defined in claim 1, wherein said plate-like center part, said elongated gripping part and said elongated shielding part are portions of a unitary element made of soft plastic.

5. A fish hook protector as defined in claim 1, wherein said plate-like center part includes opposite top and bottom edges, each of said top and bottom edges, together with said opposite side edges, providing said plate-like center part with a rhombus shape.

* * * * *